United States Patent [19]

Niemela

[11] 4,266,155
[45] May 5, 1981

[54] BRUSH HOLDER ASSEMBLY

[75] Inventor: Paul W. Niemela, Pickens, S.C.

[73] Assignee: The Singer Company, Stamford, Conn.

[21] Appl. No.: 73,961

[22] Filed: Sep. 10, 1979

[51] Int. Cl.³ .............................................. H02K 13/00
[52] U.S. Cl. .................................... 310/239; 310/247
[58] Field of Search ............... 310/239, 242, 241, 245, 310/246, 247, 248, 249

[56] References Cited

U.S. PATENT DOCUMENTS

| 3,028,515 | 4/1962 | Cheetham | 310/239 |
| 3,171,050 | 2/1965 | Gordon | 310/239 |
| 3,898,492 | 8/1975 | Vassos | 310/242 |
| 4,112,321 | 9/1978 | Wan | 310/245 |

FOREIGN PATENT DOCUMENTS 2712721  9/1978  Fed. Rep. of Germany .......... 310/242

Primary Examiner—R. Skudy
Attorney, Agent, or Firm—Elliot A. Lackenbach; Robert E. Smith; Edward L. Bell

[57] ABSTRACT

Brush tube assembly comprising a generally cylindrical brush tube having a pair of longitudinally extending slots and a brush and follower assembly slidable within said bore with said follower comprising a pair of outwardly extending spring legs provided with tabs engaged within said slots, and a compression spring confined behind said follower.

4 Claims, 5 Drawing Figures

BRUSH HOLDER ASSEMBLY

DESCRIPTION

Field of the Invention: This invention relates to electric motors and, more particularly, to brush holder assemblies therefore and finds particular utility in fractional horsepower motors such as universal A.C.-D.C. fractional horsepower motors incorporated into small power tools and appliances.

BACKGROUND OF THE INVENTION

In fractional horsepower motors, such as universal A.C.-D.C. motors as are utilized in power tools and appliances, a commutator is utilized on the motor armature which, in conjunction with a set of elements known as brushes are utilized to provide electrical connection to the rotating windings carried by the armature. The brushes are conventionally composed of compacted carbon particles combined with appropriate binders. The brushes are generally softer than the commutator so that as the commutator rubs past the brushes, the brushes rather than the commutator are worn. Means are provided for maintaining the brushes in contact with the commutator and advancing the brushes as the brushes wear.

Such means generally comprise some kine of spring and it is highly desirable that, even when the brush is completely worn, the spring be precluded from contacting the commutator since this would result in undesirable wear of the commutator and could result in actual destruction of the motor. Accordingly, various means have been heretofore utilized to prevent the brush springs from actually contacting the commutator.

OBJECTS OF THE INVENTION

Bearing in mind the foregoing, it is a primary object of the present invention to provide new and improved methods, means and apparatus for supporting and powering the brushes in electric motors for contacting the commutator and for advancing the brushes toward the commutator as the brushes wear while precluding the advancing means from contacting the commutator when the brushes are completely worn.

Another primary object of the present invention, in addition to the foregoing object, is the provision of such methods, means and apparatus for brush retention which provides novel and improved electrical connection thereto.

Still another primary object of the present invention, in addition to each of the foregoing objects, is the provision of such brush retention and advancing means which is economical to manufacture and durable and effective in use.

Yet still another primary object of the present invention, in addition to each of the foregoing objects, is the provision of novel and improved brush holder assemblies which are modular in construction enabling economic assembly thereof with the motor armature and housing.

Another and yet still further primary object of the present invention, in addition to the foregoing objects, is the provision of novel and improved brush holder assemblies enabling simple and easy brush inspection and replacement.

It is a feature of the present invention that the brush holder assembly of the present invention may be manufactured as a complete cartridge which may be quickly and easily assembled with a motor frame or housing.

The invention resides in combination, construction, arrangement and disposition of the various component parts and elements incorporated in improved brush holder assemblies in accordance with the principles of this invention. The present invention will be better understood and objects and important features other than those specifically enumerated above will become apparent when consideration is given to the following details and description which, when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved, especially as they fall within the scope and spirit of the subjoined claims.

SUMMARY OF THE INVENTION

In accordance with the present invention, a conductive brush holder tube is provided which is open at one end. The brush is disposed slidably within such tube to extend outwardly through such open end. The rearward face of the brush is provided with a generally central generally cylindrical post or boss portion which extends through an aperture in a generally U-shaped conductive follower having a pair of generally divergent spring legs each of whose ends are provided with longitudinal slits to define at least three rearwardly extending trailing fingers, the central ones of which define outwardly extending tabs riding in slots in the side walls of the brush tube. The outer fingers of the spring legs engage the walls of the brush tube to provide electrical contact therewith. Also mounted on the post or cylindrical boss is a brush advancing and biasing means, such as a compression coil spring, in turn held in position, as by a tab forming a closed end of the brush tube. The brush tube is adapted to be disposed in an insulated hollow socket integrally formed with the motor or tool frame or housing.

The brush tube is provided with a pair of longitudinal slots into which a pair of ear-like tabs extend, the tabs being bent outwardly from the legs of the follower. The tabs and slots are so configured and arranged that the tabs bottom in the slots when the brush is substantially worn preventing the follower from advancing further and thereby precluding the follower from advancing into contact with the commutator.

DESCRIPTION OF THE DRAWING

While the specification concludes with claims particularly pointing out and distinctly claiming the subject matter which is regarded as forming the present invention, it is believed the invention will be better understood from the following detailed description when taken in conjunction with the annexed drawing which discloses, illustrates and shows a preferred embodiment or modification of the present invention and what is presently considered and believed to be the best mode of practicing the principles thereof and wherein:

DETAILED DESCRIPTION OF THE PREFERRED EMBODIMENT

Figure 1:
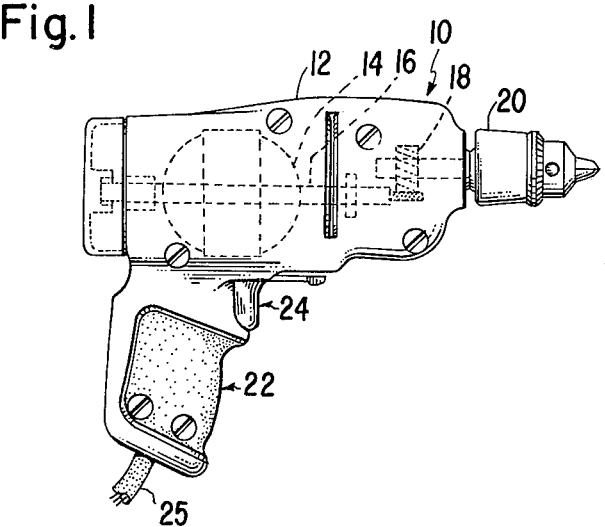
FIG. 1 is a side elevational view of a typical hand held power tool incorporating a fractional horse power universal A.C.-D.C. electric motor utilizing the brush holder assembly to the present invention.
Figure 2:
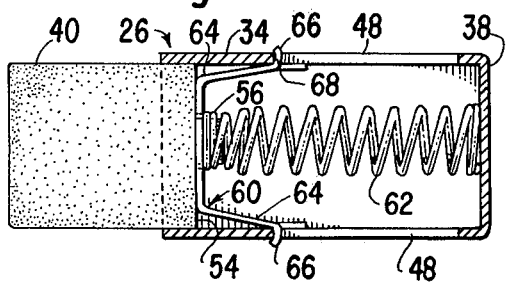
FIG. 2 is an enlarged cross-sectional illustration of a brush holder assembly cartridge constructed in accordance with the present invention.

With reference now to the drawing, there is shown and illustrated therein a power tool such as a portable electric drill designated generally by the reference character 10 which comprises a housing 12 containing a rotatable armature 14 mounted on a shaft 16 and connected through gearing 18 to a chuck 20. Field structure, comprising field windings 21 or permanent magnets are also provided in the housing 12 which also may be provided with a pistol grip portion 22 having a trigger switch 24 for controlling the drill, and a line cord 25 for providing electric power, through the trigger switch 24 to a pair of brush assemblies 26 mounted with the housing 12. As shown, the brush holder assemblies 26 comprise unitary cartridges that may be inserted sideways into sockets 28 in the frame 12, which is of insulating material, such as plastic, and held in position, as by tabs or projections 30 extending inwardly of an end cap 32. The brush holder assemblies 26 comprise a conductive i.e., metallic brush tube 34 which may, as shown, be formed to a generally rectangular cross-sectional tubular configuration with a side lock seam 36 extending longitudinally along one side thereof. The tube 34 is provided with a rear closure tab 38 which may be bent to the closed configuration shown prior to assembly or may be left in the straight position shown in phantom lines in FIG. 3 until assembly, allowing the brush 40 to be inserted therepast, after which it is closed to retain the brush 40 therewithin. Hence, the brush tube 34 and brush 40 may be assembled by passing the brush 40 through either the front or rear of the brush tube, as desired.

The brush tube 34 may be further provided with means, such as a contact or connector tab or extension 42 on the forward end portion thereof to enable an electrical wire 44 to be connected thereto, as by a friction connector 46 as will be readily appreciated by those having skill in this art.

Figure 3:
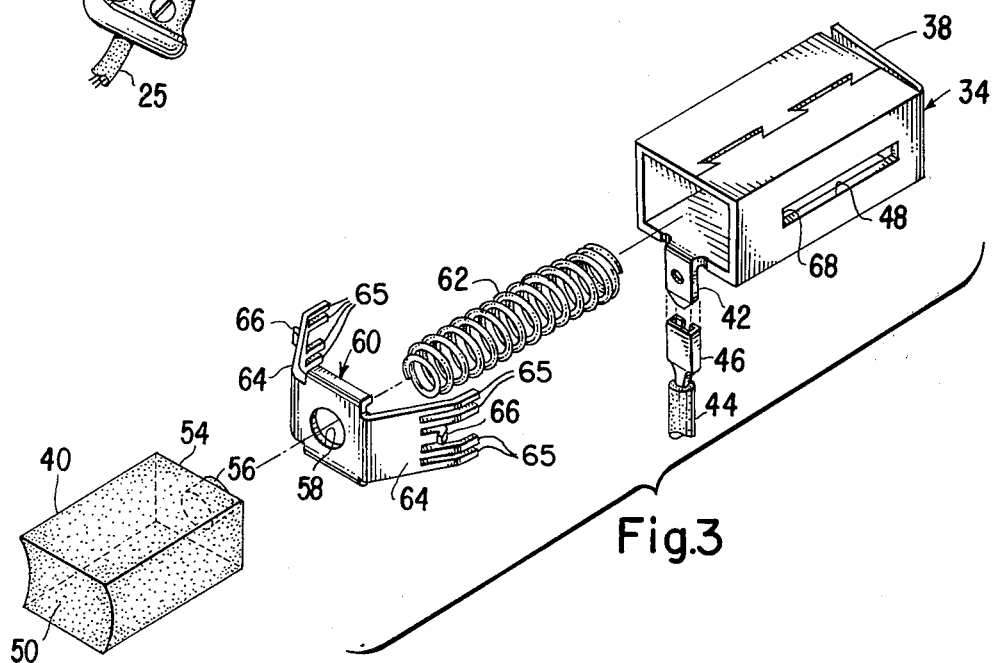
FIG. 3 is an exploded perspective view of the brush holder assembly of the preceding figures.
Figure 4:
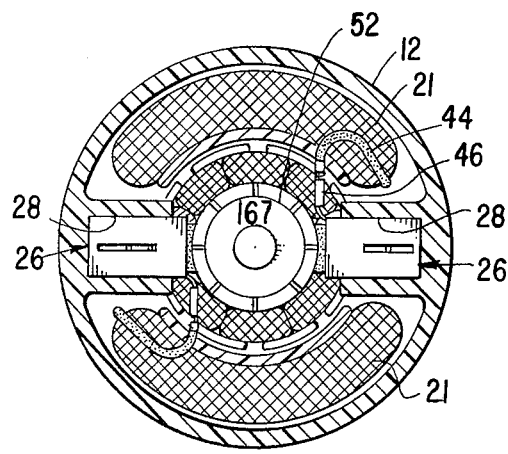
FIG. 4 is a cross-sectional elevational illustration of the brush and of the tool of FIG. 1 taken along line 4—4 of FIG. 1 showing the holder assembly of the present invention and the mounting thereof with the tool housing and the cooperation thereof with the commutator of the motor armature.
Figure 5:
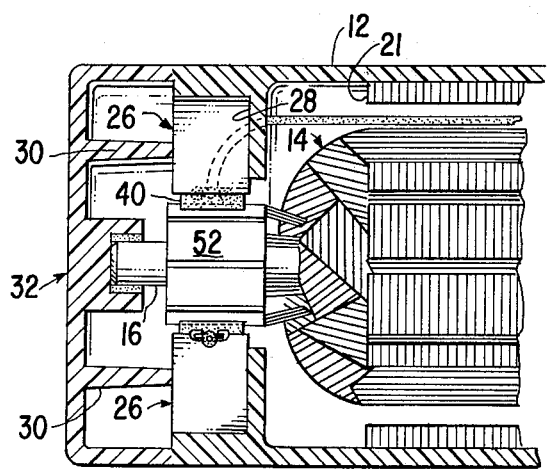
FIG. 5 is a cross-sectional illustration of the motor tool brush and taken along line 5—5 of FIG. 4.

The brush tube 34 may be further provided with a pair of closed ended elongated side slots 48. Slidably disposed in the brush tube 38 and extending outwardly through the open end thereof, as heretofore pointed out, is the brush 40. The brush 40 may be of conventional compressed carbon/binder composition and may, as shown, be of generally rectangular configuration having a front face 50 of arcuate configuration for mating contact with the commutator 52 of the motor armature 14, as shown in FIGS. 3–5. The outer end face 54 of the brush 40 may be provided with a generally centrally disposed post portion or boss 56 of generally cylindrical configuration which, in the assembled brush assembly 26 passes through an aperture 58 provided in a spring follower 60 and is engaged within the foward end turns or coils of a generally cylindrical compression spring 62. The follower 60 comprises a pair of generally diverging or outwardly extending side portions or spring legs 64. The end portions of the spring legs 64 are slitted longitudinally rearwardly, as shown, to provide at least three trailing spring fingers, at least the outer finger 65 of which engage against the inner surface of the brush tube 34 and the follower 60 is preferably of conductive, i.e., metallic material to provide electrical interconnection between the brush tube 34 and the brush 40 while yet permitting sliding movement of the brush 40 within the brush tube 34. The outward end portions of the central one of the follower spring legs 64 are bent to form generally outwardly extending trailing tabs 66 extending through the slots 48. The tabs 66 together with the forward ends 68 of the slots 48 act as stops to prevent the follower 60 from extending beyond the open end of the brush tube 34.

As will be apparent from the above description and the annexed drawing, the brush 40, follower 60 and spring 62 may be assembled with the brush tube 34 to form a modular cartridge. With reference to FIG. 4, it will be seen that when the brushes 40 are relatively new and unworn, the spring 62 will be substantially compressed and the tabs 66 will be forced rearwardly in the slots 48, as shown in FIG. 4. As shown in FIG. 5, as the brush wears, the tabs 66 will move down the slots 48 until they abut the ends 68 thereof whereupon further outward movement of the brush 40 and follower 60 will cease. At this time, replacement of the cartridges 26 will enable the brushes to be easily replaced.

While the invention has been described and illustrated in terms of a preferred embodiment or modification, such technical equivalence to the means described as well as their combination, and such other embodiments or modifications may be suggested to those having the benefit of the teachings herein are intended to be reserved should they be carried out according to the spirit of the invention.

I claim:

1. Brush holder assembly comprising a conductive tubular brush tube provided with a pair of slots extending longitudinally on opposite sides thereof; a follower of conductive material slidably contained within said brush tube and having a pair of outwardly extending spring legs each slitted longitudinally rearwardly to provide at least three trailing fingers defining at least a pair of outer fingers conductively engaging said brush tube and a central finger bent to form outwardly extending trailing tabs engaged within said slots; a compression spring confined behind said follower urging said follower towards engagement of said tab against the forward ends of said slots to provide positive stops preventing said follower from moving further outwardly of said brush tube; and a brush carried by said follower extending oppositely from said spring.

2. Brush holder assembly defined in claim 1 wherein said brush tube and said brush are of generally rectangular mating cross-sectional configuration.

3. Brush holder assembly defined in claim 1 wherein said follower is provided with a generally central aperture, said brush is provided with a generally cylindrical boss extending through said aperture and engaging the end coils of said compression spring whereby said spring, follower and brush comprise a modular subassembly.

4. Brush tube assembly defined in any of claims 1, 2, or 3 wherein said brush tube further comprises an end wall closing the end of said tube opposite said brush.

* * * * *